(12) United States Patent
Trundle et al.

(10) Patent No.: US 12,323,742 B2
(45) Date of Patent: Jun. 3, 2025

(54) ACCESS CONTROL SYSTEM

(71) Applicant: Alarm.com Incorporated, Tysons, VA (US)

(72) Inventors: Stephen Scott Trundle, Falls Church, VA (US); Daniel Todd Kerzner, McLean, VA (US); James Jay Glickstein, Arlington, VA (US); Benjamin Asher Berg, Washington, DC (US); Allison Beach, Leesburg, VA (US); Donald Gerard Madden, Columbia, MD (US)

(73) Assignee: Alarm.com Incorporated, Tysons, VA (US)

( * ) Notice: Subject to any disclaimer, the term of this patent is extended or adjusted under 35 U.S.C. 154(b) by 90 days.

(21) Appl. No.: 17/404,403

(22) Filed: Aug. 17, 2021

(65) Prior Publication Data
US 2022/0070415 A1 Mar. 3, 2022

Related U.S. Application Data

(60) Provisional application No. 63/070,936, filed on Aug. 27, 2020.

(51) Int. Cl.
*H04N 7/18* (2006.01)
*G06Q 10/0836* (2023.01)
*G06V 40/20* (2022.01)
*G07C 9/38* (2020.01)

(52) U.S. Cl.
CPC ......... *H04N 7/188* (2013.01); *G06Q 10/0836* (2013.01); *G06V 40/23* (2022.01); *G07C 9/38* (2020.01); *H04N 7/183* (2013.01); *G07C 2209/08* (2013.01)

(58) Field of Classification Search
CPC .......... H04N 7/188; H04N 7/183; G07C 9/38; G07C 2209/08; G06V 40/23; G06Q 10/0836
USPC ....................................... 348/156
See application file for complete search history.

(56) References Cited

U.S. PATENT DOCUMENTS

| | | |
|---|---|---|
| 5,559,961 A | 9/1996 | Blonder |
| 5,719,950 A | 2/1998 | Osten et al. |
| 6,041,410 A | 3/2000 | Hsu et al. |
| 6,718,471 B1 | 4/2004 | Kashima |

(Continued)

OTHER PUBLICATIONS

PCT Invitation to Pay Additional Fees in International Appln. No. PCT/US2021/047323, dated Nov. 5, 2021, 2 pages.

(Continued)

*Primary Examiner* — Michael E Teitelbaum
*Assistant Examiner* — Omer Khalid
(74) *Attorney, Agent, or Firm* — Fish & Richardson P.C.

(57) ABSTRACT

Methods, systems, and apparatus, including computer programs encoded on computer storage media, for controlling access to a premises. One of the methods includes detecting a person within a threshold distance of a door; determining that there is a threshold likelihood that the person may access the door; providing instructions that indicate one or more criteria for access to the door; determining that a threshold quantity of the one or more criteria are satisfied; and in response to determining that the threshold quantity of the one or more criteria are satisfied, providing access to the door.

22 Claims, 3 Drawing Sheets

(56) References Cited

U.S. PATENT DOCUMENTS

| | | |
|---|---|---|
| 6,819,219 B1 | 11/2004 | Balle et al. |
| 6,850,147 B2 | 2/2005 | Prokoski et al. |
| 6,862,687 B1 | 3/2005 | Suzuki |
| 6,980,081 B2 | 12/2005 | Anderson |
| 7,111,174 B2 | 9/2006 | Hamid |
| 7,389,425 B2 | 6/2008 | Hasbun et al. |
| 7,451,323 B2 | 11/2008 | Abe et al. |
| 7,593,000 B1 | 9/2009 | Chin |
| 7,697,735 B2 | 4/2010 | Adam et al. |
| 7,882,032 B1 | 2/2011 | Hoffman |
| 7,953,983 B2 | 5/2011 | Holt et al. |
| 8,248,262 B2 | 8/2012 | Robison, Jr. et al. |
| 8,452,978 B2 | 5/2013 | Alward et al. |
| 8,458,485 B2 | 6/2013 | Bandyopadhyay et al. |
| 8,589,069 B1 | 11/2013 | Lehman |
| 8,627,235 B2 | 1/2014 | Chang et al. |
| 8,782,775 B2 | 7/2014 | Fadell et al. |
| 8,937,687 B2 | 1/2015 | Coburn et al. |
| 8,938,797 B2 | 1/2015 | Bedworth |
| 9,141,150 B1 | 9/2015 | Trundle et al. |
| 9,792,422 B1 | 10/2017 | Trundle et al. |
| 10,354,059 B1 | 7/2019 | Trundle et al. |
| 10,482,420 B1 * | 11/2019 | Brooks ............... G06Q 10/0836 |
| 10,867,026 B1 | 12/2020 | Trundle et al. |
| 11,318,960 B1 * | 5/2022 | McKnew ............... G06V 20/59 |
| 2002/0029341 A1 | 3/2002 | Juels et al. |
| 2003/0028784 A1 | 2/2003 | Uchida |
| 2003/0046552 A1 | 3/2003 | Hamid |
| 2003/0210127 A1 | 11/2003 | Anderson |
| 2005/0101314 A1 | 5/2005 | Levi |
| 2005/0171851 A1 | 8/2005 | Applebaum et al. |
| 2006/0015638 A1 | 1/2006 | Holzhauser et al. |
| 2006/0176146 A1 | 8/2006 | Krishan et al. |
| 2006/0176167 A1 | 8/2006 | Dohrmann |
| 2006/0258376 A1 | 11/2006 | Ewell, Jr. |
| 2006/0272007 A1 | 11/2006 | Sweeley et al. |
| 2008/0092245 A1 | 4/2008 | Alward et al. |
| 2008/0278283 A1 | 11/2008 | Slevin |
| 2010/0205667 A1 | 8/2010 | Anderson et al. |
| 2010/0315358 A1 | 12/2010 | Chang et al. |
| 2010/0325721 A1 | 12/2010 | Bandyopadhyay et al. |
| 2011/0161232 A1 | 6/2011 | Brown |
| 2014/0016835 A1 | 1/2014 | Song et al. |
| 2015/0029335 A1 | 1/2015 | Kasmir et al. |
| 2015/0049191 A1 | 2/2015 | Scalisi et al. |
| 2015/0228167 A1 | 8/2015 | Scalisi et al. |
| 2016/0105644 A1 | 4/2016 | Smith et al. |
| 2016/0180667 A1 | 6/2016 | Bunker et al. |
| 2016/0203370 A1 | 7/2016 | Child et al. |
| 2017/0206497 A1 * | 7/2017 | Kriss ............... G01G 19/414 |
| 2017/0236193 A1 * | 8/2017 | Zundel ............... G06Q 20/20 705/16 |
| 2018/0276961 A1 | 9/2018 | Roth et al. |
| 2018/0341835 A1 | 11/2018 | Siminoff |
| 2018/0350213 A1 | 12/2018 | Bart et al. |
| 2019/0244448 A1 | 8/2019 | Alamin et al. |
| 2019/0347916 A1 | 11/2019 | Wild et al. |
| 2020/0237946 A1 * | 7/2020 | Shell ............... A61L 2/28 |
| 2021/0072419 A1 * | 3/2021 | Birnkrant ............... G01V 3/00 |
| 2021/0358250 A1 * | 11/2021 | Venetianer ............... G07C 9/37 |
| 2022/0028192 A1 * | 1/2022 | O'Rourke ............... G07C 9/00182 |

OTHER PUBLICATIONS

PCT International Search Report and Written Opinion in International Appln. No. PCT/US2021/047323, dated Jan. 21, 2022, 10 pages.

* cited by examiner

ACCESS CONTROL SYSTEM

CROSS-REFERENCE TO RELATED APPLICATION

This application claims the benefit of U.S. Provisional Application No. 63/070,936, filed on Aug. 27, 2020, the contents of which are incorporated by reference herein.

BACKGROUND

Video cameras can capture a video sequence that includes one or more frames, e.g., images. A system can analyze the video sequence to determine content depicted in the video sequence. For instance, a system can analyze frames received from a camera to determine whether the frames depict people.

SUMMARY

A system can use analytics, e.g., video analytics and other sensor data, to control access to a physical environment. For instance, a system can use video analytics data to control access, and how a person gains access, to a physical environment. The system can detect when a person approaches a door and provide information to the user, either audible or visible, to instruct the user how to gain access to the door. The system can provide information that indicates that the person should stand in a particular place, make a particular gesture, put on one or more articles of protective clothing, or a combination of these.

When the system detects that the person has satisfied access requirements, the system can provide access to a physical environment. This can include the system notifying another person in the physical environment that the person wants access to the physical environment, or requested to speak to the other person. Such a notification can be similar to a doorbell notification that the person is at the other person's door.

Providing access can include authenticating the person. For example, when the system determines that the person is allowed access to the physical environment, e.g., based on authenticating an identification badge or facial features for the person, the system can determine whether the person satisfies additional access constraints before enabling the person's access to the physical environment. The additional access constraints can include whether the person is wearing particular protective clothing, has received certain immunizations, does not have more than a threshold likelihood of being sick, or another appropriate constraint.

The system can determine whether a person has more than a threshold likelihood of being sick based on images, other data, or both, of the person. The images can include visible spectrum images, infrared images, or other appropriate images. For instance, the system can determine whether a person's temperature is elevated using infrared images, whether a person has external manifestations that are associated with likely being sick using visible spectrum images, or both.

In some implementations, the system can detect a package delivery process. The system can provide instructions to a package delivery person on where to leave a package. The system can determine a process to perform based on predicted contents of the package. For instance, the system can use video analytics about the package, or information about recent orders for a corresponding building, to determine a likely content type for the package. Some content types include food, electronics, plants, or furniture.

In implementations in which the system detects a package delivery process, the system need not instruct the user how to gain access to a door or another part of a premises. That is, the system can perform operations for providing access to a door, for providing a notification about a delivery, or some combination of both.

When the system predicts a first content type, e.g., food or plants, the system can provide a notification to another person at the building that indicates that the package has been delivered. The notification can indicate a risk level that the other person might be contaminated by a pathogen during their interactions with the package.

When the system predicts a second content type, e.g., electronics or furniture, the system can determine a time period to wait before providing a notification. The system can select the time period based on current conditions for the package. The current conditions can include whether the package is sitting in the sun, the temperature, or other appropriate parameters that affect a likelihood of whether any pathogens on the package may die, or a likelihood that a sufficient level of decontamination has taken place, given the corresponding parameter. After the time period expires, the system can then provide a notification to another person that indicates the package delivery, and potentially the risk level for the package.

In some examples, the system can provide a first notification when the package arrived and a second notification after the time period expires. For instance, the system can provide a first notification that indicates delivery of the package and recommends that the other person wait at least for the duration of the time period before retrieving the package. The first notification can include a timer that indicates the amount of the time period that is left. The system can select content for the first notification, such as an image for the time or other graphical content, based on the predicted second content type. For instance, the first notification can include an image of a chair behind the timer when the second content type is furniture.

Once the time period expires, the system can then provide the second notification. The second notification can indicate that the time period has expired and that it is likely safer for the person to retrieve the package.

In general, one innovative aspect of the subject matter described in this specification relates to an access control system, and can be embodied in methods that include the actions of detecting a person within a threshold distance of a door; determining that there is a threshold likelihood that the person may access the door; providing instructions that indicate one or more criteria for access to the door; determining that a threshold quantity of the one or more criteria are satisfied; and in response to determining that the threshold quantity of the one or more criteria are satisfied, providing access to the door.

In general, one innovative aspect of the subject matter described in this specification relates to an access control system, and can be embodied in methods that include the actions of detecting a person within a threshold distance of a door; determining that there is a threshold likelihood that the person may deliver a package; determining, using contextual data for the package, a delivery location for the package; providing first instructions that indicate the delivery location for the package; determining, using the contextual data for the package, a wait timer that indicates a recommended time period to wait before retrieving the package; generating instructions to cause presentation of a user interface that indicates the delivery location for the package; and providing, to a device and using the wait timer, the instructions to cause the device to present the user interface that indicates the delivery location for the package.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Detecting the person within the threshold distance of the door can include detecting, using an image that depicts the person, that the person is likely within the threshold distance of the door. The image might not depict the door.

In some implementations, detecting the person within the threshold distance of the door can include detecting, using audio data that encodes the person speaking, that the person is likely within the threshold distance of the door. Detecting the person within the threshold distance of the door can include detecting, using motion data that indicates movement of the person, that the person is likely within the threshold distance of the door.

In some implementations, providing the instructions that indicate the one or more criteria for access to the door can include providing the instructions that indicate one or more predetermined actions for the person to perform to gain access to an area behind the door without touching the door. Determining that the threshold quantity of the one or more criteria are satisfied can include determining that the threshold quantity of the one or more predetermined actions are satisfied. Providing access to the door can be responsive to determining that the threshold quantity of the one or more predetermined actions are satisfied.

In some implementations, providing the instructions that indicate the one or more criteria for access to the door can include providing the instructions that indicate one or more actions for the person to perform to trigger a virtual doorbell. Determining that the threshold quantity of the one or more criteria are satisfied can include determining that the person satisfied at least a threshold likelihood of performing the one or more actions. Providing access to the door can include triggering the virtual doorbell. The method can include receiving instructions that indicate that the person should be allowed access to the door.

In some implementations, the method can include, in response to receiving the instructions that indicate that the person should be allowed access to the door, performing at least one of unlocking the door or opening the door. Triggering the virtual doorbell can include sending a message to a mobile device to cause the mobile device to trigger a virtual doorbell. Triggering the virtual doorbell can include sending a message to a device with a speaker to cause the speaker to trigger a virtual doorbell.

In some implementations, providing the instructions that indicate the one or more criteria for access to the door can include providing, to a device with a speaker, the instructions that indicate the one or more criteria for access to the door to cause the speaker to present the one or more criteria audibly. Providing the instructions that indicate the one or more criteria for access to the door can include providing, to a display device, the instructions that indicate the one or more criteria for access to the door to cause the display device to present the one or more criteria visually.

In some implementations, providing the instructions that indicate the one or more criteria for access to the door can include providing, to a device operated by the person, the instructions that indicate the one or more criteria for access to the door to cause the device operated by the person to present the one or more criteria. Providing the instructions that indicate the one or more criteria for access to the door can include providing, to a device for the premises, the instructions that indicate the one or more criteria for access to the door to cause the device for the premises to present the one or more criteria. The device for the premises can be physically connected to the premises.

In some implementations, providing the instructions that indicate the one or more criteria for access to the door can be responsive to determining that there is the threshold likelihood that the person may access the door. The method can include determining the threshold quantity using contextual data for when the person was detected within the threshold distance of the door. The method can include determining the one or more criteria using contextual data for when the person was detected within the threshold distance of the door.

In some implementations, providing access to the door can include performing at least one of unlocking the door or opening the door. Generating the instructions to cause presentation of the user interface can include generating instructions to cause presentation of the user interface that indicates a) the delivery location for the package, b) the wait timer, and c) a message recommending that the package be retrieved after expiration of the wait timer. Providing, to the device and using the wait timer, the instructions can include waiting until the wait timer expires; and after expiration of the wait timer, providing, to the device, the instructions to cause the device to present the user interface that indicates the delivery location for the package.

The subject matter described in this specification can be implemented in various embodiments and may result in one or more of the following advantages. In some implementations, the systems and methods described in this document can increase personal safety, reduce a likelihood that another person will get sick, or both, by determining whether to provide a person access to a premises at which the other person is located, by determining a threshold period of time before the other person should access an area in which the person was located, or both. As a result, the systems and methods described in this document can limit surface contamination, reduce the risk of disease transmission, or both.

In some implementations, the systems and methods described in this document can reduce energy consumption by determining, when a person is at a premises, whether to notify another person at the premises about the person. The systems and methods can do this by determining whether one or more criteria are satisfied and only providing a notification when at least some, e.g., a threshold number, of the criteria are satisfied and determining to skip providing a notification when an insufficient number of the criteria are satisfied or none of the criteria are satisfied. This can include a determination of a risk factor and only providing a notification when the risk factor does not satisfy a threshold risk factor, e.g., the risk is below a threshold risk. This can reduce energy consumption because an access control system only needs to provide a single notification when a threshold number of criteria are satisfied and won't provide any notifications when the threshold number of criteria are not satisfied, the latter of which could include multiple notifications as the system determines additional criteria, less than the threshold number, are satisfied.

For instance, energy consumption based on notifications could occur when the access control system detects a visitor approaching a premises, such as a house. The access control system could send a first notification upon detecting the visitor, a second notification upon determining that there is a threshold likelihood that the visitor will knock on a door to the premises, and a third notification upon determining that the visitor satisfies a threshold quantity of criteria, e.g., that the person is wearing a mask and does not have an elevated temperature but instead has a temperature that does not satisfied an elevated temperature threshold. Instead, by using the described systems and methods, the access control system can send a single notification upon determining that the visitor satisfies the threshold quantity of criteria, e.g., potentially including that there is at least the threshold likelihood that the visitor will knock on the door, reducing possible energy consumption that would be required for sending the second and third notifications.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
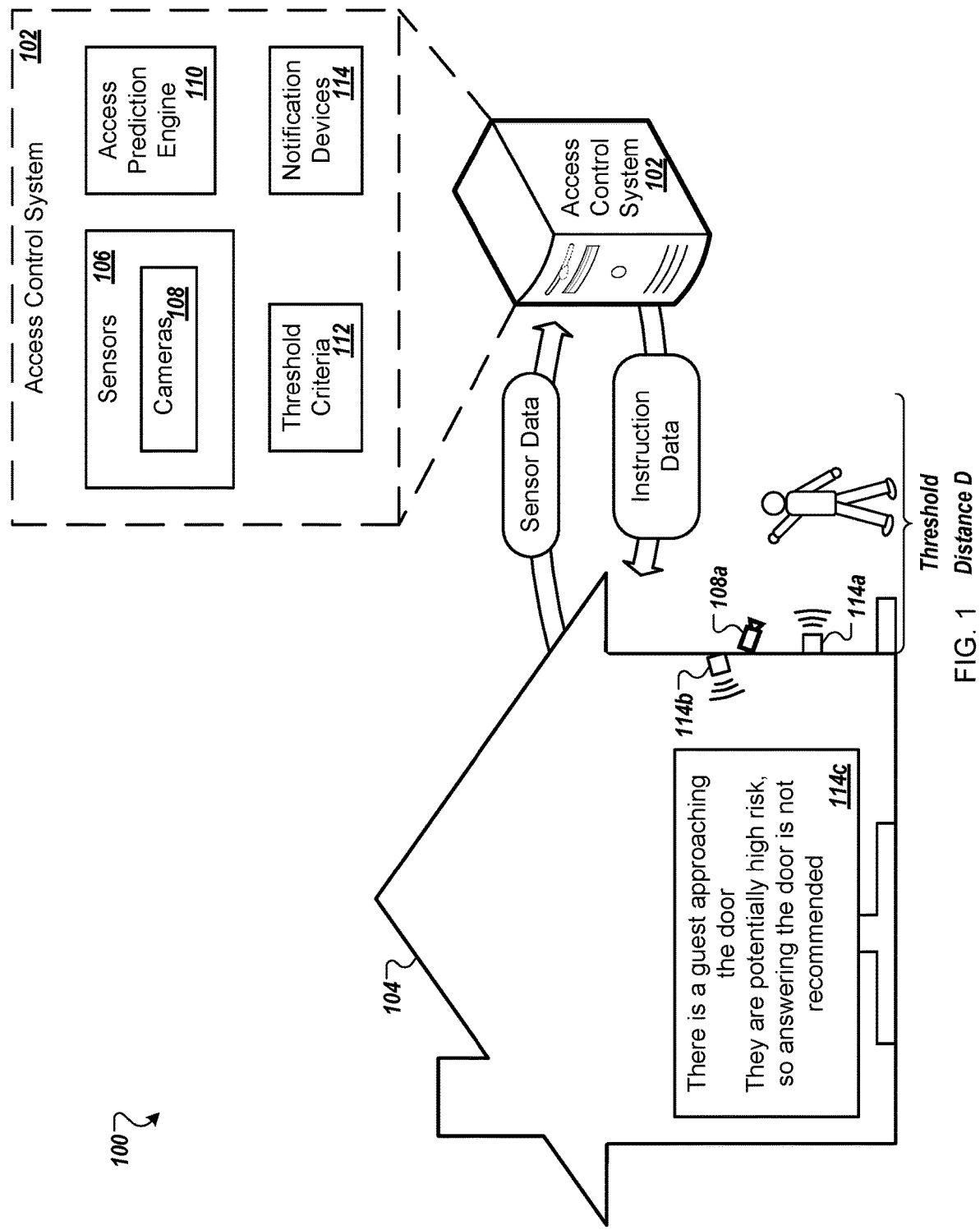
FIG. 1 depicts an example environment in which an access control system controls access to a premises.

FIG. 1 depicts an example environment 100 in which an access control system 102 controls access to a premises 104. Although the environment 100 includes a house as the premises 104, the access control system 102 can control access to other types of premises 104, such as an office, a park, a museum, or a theater. In some examples, other types of premises can include an area of a building. For instance, the access control system 102 can control access to a narrow entrance to a school building, where a limited number of people can enter the space at a time, or a shared space in an office building where personal protective equipment is required, such as a foyer or a stairwell.

The access control system 102 includes one or more sensors 106. The sensors 106 can include cameras 108, such as a doorbell camera 108a or another type of camera. The access control system 102 receives sensor data from one or more of the sensors 106 and uses the sensor data to determine whether to grant a person access to the premises 104, whether to notify someone at the premises 104 about the person, or both. The access control system 102 can receive images from the cameras 108 and analyze the images. For instance, the access control system 102 can receive a sequence of images, such as a live video feed, from the camera 108a.

An access prediction engine 110, included in the access control system 102, can analyze the received sensor data, e.g., the received images. For example, the access prediction engine 110 analyzes the sensor data to detect objects represented by the sensor data. This can include analyzing the received images to detect objects depicted in the images. The access prediction engine 110 can determine whether a detected object is likely a person. The access prediction engine 110 can use any appropriate sensor analysis, e.g., image analysis, to detect objects represented by the sensor data and determine whether a detected object is likely a person.

When the access prediction engine 110 determines that an object represented by the sensor data is likely a person, the access prediction engine 110 determines a likelihood that the person may access the premises 104, as described in more detail below. The likelihood can represent a likelihood that the person will knock on the door, will try to open the door, will try to activate a doorbell, or a combination of these. The access prediction engine 110 can use any appropriate method to determine the likelihood. For instance, the access prediction engine 110 can provide some of the sensor data to a machine learning model that processes the data and generates, as output, the likelihood.

The access to the premises 104 can be actual entry onto or into the premises 104, interaction with another person at the premises, or both. For instance, the person may want to enter into a house or an office as the premises 104. In some examples, the person may want to talk to a person who lives or works at the premises but need not physically enter the premises 104.

The access prediction engine 110 can compare the likelihood with a threshold likelihood. When the likelihood satisfies the threshold likelihood, e.g., is greater than or equal to or either, the access control system 102 can determine to perform one or more actions.

The one or more actions can include providing instructions to the person, notifying another person at the premises 104 that the person is approaching the premises 104, or both. For instance, access control system 102 can provide instructions to the person to prevent the person from touching the door, a doorbell, or another part of the premises. The access control system 102 can provide the instructions to the person using a notification device 114. For example, the notification devices 114 can include an outdoor speaker 114a, e.g., part of an intercom system, by which the access control system 102 can provide audible instructions to the person. In some examples, the notification devices 114 can include an outdoor display device on which instructions for the person are presented.

Although the outdoor speaker 114a and the outdoor display device are referred to as being "outdoor", one or both of these devices need not be outdoors. For instance, when the premises 104 includes a reception area, the outdoor speaker 114a, the outdoor display device, or both, can be located in the reception area. In these examples, the access control system 102 can provide the person with access to the reception area before providing the person with access to the rest of the premises 104.

When the access control system 102 determines that the likelihood satisfies the threshold likelihood, the access control system 102 can provide a notification to the other person at the premises 104. The access control system 102 can provide an audible notification to the other person using a speaker 114*b*, a display 114*c*, or both. For instance, the access control system 102 can display a message that "there is a guest approaching the door" on the display 114*c*, and audibly present the message using the speaker 114*b*.

In some examples, the access control system 102 can present an audible sound of a doorbell ringing. The access control system 102 can present this audible alert even though the person never actually presses a doorbell or otherwise touches the premises 104.

The speaker 114*b* and the display 114*c* can be in a single device or separate devices. For instance, the speaker 114*b* and the display 114*c* can be part of a mobile device, a monitor, or another appropriate device.

When the access control system 102 determines that the likelihood does not satisfy the threshold likelihood, e.g., is less than or equal to or either, the access control system 102 can determine to skip performing an action, or to notify another person at the premises 104. In these examples, the access control system 102 can determine how to proceed based on an analysis of the person and what the person is likely doing near the premises 104. For instance, when the access control system 102 determines that the person is retrieving something that fell onto a property surrounding the premises 104, e.g., such as when a child is getting a ball that landed on the property, the access control system 102 can determine to skip performing an action.

When the access control system 102 determines that the person is likely leaving something at the premises, such as a delivery person leaving a package, the access control system 102 can determine an action to perform based on a prediction of the contents of what is left at the premises. The access control system 102 can predict the contents of the package using one or more images of the package, an estimated weight for the package, expected deliveries for the premises 104, or a combination of two or more of these.

The access control system 102 can receive, from the camera 108*a* or another camera at the premises 104, one or more images of the package. The images can depict shipping information, such as a deliverer entity, which shipped the package, and a recipient entity, to which the package was shipped. The access control system 102 can use information about the deliverer entity to predict the contents of the package. For instance, when the deliverer entity is a furniture company, the access control system 102 can predict that the package includes furniture. Given that furniture generally can withstand heat, sitting in the sun, or both, the access control system 102 can determine a safety duration that indicates a time period after which another person at the premises can retrieve the package. The time period can be selected based on a likelihood that a sufficient level of decontamination has taken place by the end of the time period.

For example, the access control system 102 can use a temperature for the area in which the package is located, data that indicates whether the package is sitting in the sun, a type of material for the package, e.g., cardboard, wood, or plastic, or a combination of these, to determine the time period. The access control system 102 can determine a longer time period for packages that are in the shade, in a lower temperature area, or both, compared to packages that are in the sun, in a higher temperature area, or both.

The access control system 102 can provide a notification to another person about the delivered package. The access control system 102, e.g., one of the notification devices 114, can provide the notification after the time period has expired. In some examples, the access control system 102 can provide the notification before the time period has expired.

In these examples, the notification can indicate when the time period will expire. This can enable the other person to wait until the time period has expired to reduce a likelihood that the person will get sick because of a pathogen on the package.

In some implementations, the access control system 102 can use an estimated weight of a package to determine an action to take. The access control system 102 can predict the estimated weight using predicted contents of the package, a weight measure in a surface over which the package is transported, images that indicate a change in suspension of a package transportation device, e.g., a dolly, or another appropriate process. For instance, the access control system 102 can analyze images of a package transportation device carrying the package and images of the package transportation device not carrying the package. The access control system 102 can determine a change in suspension of the package transportation device using the images, and an estimated weight using the change in suspension.

In some implementations, the access control system 102 can determine predicted package contents using data that indicates expected deliveries for the premises 104. The data that indicates expected delivers can include calendar information for the premises 104, e.g., a person who works at or resides at the premises 104. The calendar information can indicate, for a delivery, a time window in which the delivery might occur and what is to be delivered.

In some examples, the data that indicates expected delivers can include a database of orders for the premises 104. The database can include receipts for purchases made by or on behalf of people at the premises 104, e.g., people who reside or work at or for the premises 104.

In some implementations, the access control system 102 can use other data that indicates weather conditions when determining when, how, or both, to notify another person at the premises 104 about a delivery. For instance, the access control system 102 can use weather data that indicates whether there is any precipitation, e.g., rain or snow, that may damage the delivered item. If there is precipitation, or at least a threshold likelihood of precipitation, the access control system 102 can uses a shorter time period or no time period before notifying the other person about the delivery.

The access control system 102 can use data that indicates whether the person was wearing personal protective equipment when delivering the object. The access control system 102 can select a shorter time period, or no time period, when the delivery person was wearing personal protective equipment compared to when a delivery person was not wearing personal protective equipment.

In some examples, the access control system 102 can use data that indicates one or more preferences for the premises 104 when determining when, how, or both, to provide a notification about a delivery. The preferences can indicate a) whether the access control system 102 should wait before providing a notification about a delivery, b) a minimum time period or a maximum time period before the access control system 102 provides a notification, c) whether a delivery person must wear personal protective equipment, e.g., when making the delivery, or d) a combination of two or more of these. For example, the access control system 102 can have two minimum time periods: a first for a delivery person who was wearing personal protective equipment and a second for a delivery person who was not wearing personal protective equipment. When the access control system 102 determines that the delivery person is not wearing personal protective equipment, the access control system 102 can provide instructions, e.g., to a notification device 114, to cause presentation of a message that indicates that the delivery person should wear personal protective equipment when making the delivery.

For situations in which the systems discussed here collect personal information about users, or may make use of personal information, the users may be provided with an opportunity to control whether programs or features collect personal information (e.g., information about a user's calendar, purchase history, expected deliveries, or a user's location), or to control whether and/or how to receive content from the access control system 102 that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the access control system 102.

In some implementations, the premises can be a floor, e.g., level, in a building, an area within a floor, e.g., level, in a building, or another appropriate part of a building. For instance, the premises could be a shared space in a building, such as a kitchen area, a sitting area, a hallway, a stairwell, an elevator, or a foyer. In these implementations, the access control system 102 can determine whether a person is likely going to access a shared space and, if so, whether to allow the person access to the shared space. The access control system 102 can determine whether the person is likely going to access the share space using one or more of the processes described throughout this document.

When the access control system 102 determines that the person is likely to access the shared space, the access control system 102 can send a notification to a device for the user that indicates whether the person is allowed to access the shared space. The access control system 102 can determine whether to allow the person to access the shared space based on whether another person is in the shared space, less than a threshold quantity of people are in the shared space, or another appropriate criteria. When a quantity of people in the shared space satisfies the threshold quantity, e.g., is less than the threshold quantity, the access control system 102 can determine to allow the person access to the shared space.

In some examples, the access control system 102 can send a notification to a device of another person in the shared space. For instance, the notification can indicate that someone wants access to the shared space, that the other person should leave the shared space within a specified period of time, or request permission to allow the person access to the shared space.

In some implementations, the access control system 102 can provide the person with a notification that indicates that the person is now allowed access to the shared space. The person can be allowed access when the other person granted access, the threshold quantity of people for the shared space is satisfied, or both. For instance, the access control system 102 can provide a device for the person a first notification that indicates that the person does not have access to the shared space, e.g., when more than the threshold quantity of people are using the shared space. When the access control system 102 determines that the person should be allowed access to the shared space, e.g., because the quantity of people in the shared space now satisfies the threshold quantity, the access control system 102 can provide a second notification that indicates that the person is now allowed access to the shared space.

As described briefly above, the access control system 102 can use any appropriate process to determine a likelihood that a person may access the premises 104. The access control system 102 can use sensor data when making this determination. The sensor data can include image data, audio data, motion data, pressure data, or other appropriate data.

For instance, when the access prediction engine 110 uses image data to determine the likelihood, the access prediction engine 110 can analyze images to determine a person's predicted trajectory near the premises 104. The image data can be from the doorbell camera 108a, an intercom, or another appropriate camera or cameras. The access prediction engine 110 can determine the predicted trajectory by analyzing multiple images that show the person moving. When the person is moving toward a door at the premises, the access prediction engine 110 can determine that the likelihood that the person may access the premises 104 satisfies the threshold likelihood.

When the person is moving toward something other than a door at the premises, the access prediction engine 110 can determine that the likelihood that the person may access the premises 104 does not satisfy the threshold likelihood. For instance, the person may be moving toward an object near the premises 104, such as a ball that rolled onto grass near the premises 104 or a water meter on an exterior of the premises 104.

In some examples, the access prediction engine 110 can use audio data to determine the likelihood. For instance, the access prediction engine 110 can receive audio data, e.g., from an intercom, while a person is walking toward the premises. The access prediction engine 110 can analyze the audio data for one or more key phrases, such as "drop this off", "knock on the door", or "is anyone home." The access prediction engine 110 can use data that indicates whether any of the key phrases were detected in the audio data to determine the likelihood that the person may try to access the premises 104. In some examples, the key phrases can include spoken phrases of greeting, e.g., "hello".

In some implementations, the access prediction engine 110 uses image data that indicates particular gestures of a person when determining the likelihood. For instance, the access prediction engine 110 can determine whether a person's gestures corresponds to a gesture from a group of premises access gestures. Each gesture in the group of premises access gestures can be a gesture that satisfies at least a threshold gesture likelihood that a person performing the gesture may want access to the premises. For instance, the gestures in the group of premises access gestures can include waving, moving a hand toward a doorbell or a door handle, forming a fist to knock on a door, looking at a camera, e.g., an intercom camera, approaching the premises 104 at a certain speed, passing a threshold distance D, or a combination of two or more of these.

The access prediction engine 110 can have two or more groups of premises gestures. For instance, a first group can indicate gestures that satisfy the threshold gesture likelihood while a second group can indicate gestures that satisfy a threshold delivery likelihood. Gestures in a group of premises delivery gestures can include picking up a package, dropping off a package, carrying a package, pointing to a package, or another appropriate gesture. The access control system 102 can use gestures in the second group to determine whether the person is a delivery person and to notify another person at the premises 104 after the person has left or at another appropriate time.

In addition to or instead of using delivery gestures, the access prediction engine 110 can determine whether the person is a delivery person, and does not satisfy the threshold likelihood of accessing the premises 104, using data that indicates any objects the person may be carrying, a uniform that the person may be wearing, or both. For instance, the access prediction engine 110 can determine that the person is likely delivering an object if they are carrying a delivery signature acceptance device. The access prediction engine 110 can determine that the person is likely delivering an object if the person is wearing a recognized uniform, e.g., that includes the name of a delivery company on the uniform.

The access prediction engine 110 can perform similar analysis for a delivery person who is picking up a package as a delivery person who is dropping a package off. For instance, the access prediction engine 110 can use data for another person's calendar, data that indicates a uniform the delivery person is wearing, and data that indicates that the delivery person is carrying a package scanner to determine that the delivery person is likely picking up a package from the premises 104, e.g., that is sitting outside the premises 104.

In some implementations, the access prediction engine 110 can determine that the likelihood satisfies the threshold likelihood when the person's trajectory is not toward a door for the premises. For example, when the access prediction engine 110 analyzes data for both the person's trajectory and gestures, or just the person's gestures, the access prediction engine 110 can determine that the person's gestures correspond to a gesture in the premises access gestures, e.g., that the person is waving. This can occur when the person sees someone in a window at the premises 104 and approaches the window rather than a door at the premises 104.

In these implementations, the access control system 102 can provide a notification to another person at the premises 104 about the person. The other person can be the person to whom the person was waving or someone else. The notification can alert the other person of the person's presence, e.g., in case the other person was unaware of the person's presence near the premises 104. In some examples, the notification can indicate a risk factor for allowing the person access to the premises 104, as described in more detail below.

In some implementations, the access control system 102 can provide instructions, to the person approaching the premises 104, that indicate how the person can trigger a virtual doorbell, e.g., for the premises. For instance, when the access prediction engine 110 determines that the person is within the threshold distance D of the premises 104, e.g., from an entry door at the premises, the access prediction engine 110 can send a message regarding the determination to the access control system 102. The access control system 102 can use the message to determine to provide the instructions. The access control system 102 can cause one of the notification devices 114, e.g., the outdoor speaker 114a, to provide the instructions.

The instructions can indicate that the person should stand a certain distance from the door to the premises 104, from a camera, e.g., the doorbell camera 108a, or another portion of the premises 104. The instructions can indicate a location at which the person should stand, e.g., on a mat or an otherwise marked area.

When the access control system 102, e.g., the access prediction engine 110, determines that the person has satisfied the instructions, the access control system 102 can trigger the virtual doorbell. For example, the access control system 102 can determine that the person is about a threshold distance from the door, the camera, or the other portion of the premises 104. The access control system can determine that the person has been at the indicated location for a threshold period of time, e.g., that the person stood at the marked area for the threshold period of time.

In some implementations, the access control system 102 can provide instructions to the person that indicate an action that the person should perform. The actions can be virtual knocking, e.g., in the air; waving; dancing; making a certain gesture; making a certain facial expression; speaking a key phrase; or a combination of two or more of these. The actions can include instruction the person to go to a certain area by the premises 104 along with one of these actions. When the access control system 102 determines that the person, e.g., the person's actions, satisfy at least a threshold likelihood that the person performed the action, or actions, the access control system 102 can trigger a virtual doorbell or perform another appropriate action.

In some implementations, the access control system 102 can determine instructions based on a situation. For instance, the access control system 102 can determine the weather and, using information about the weather, determine an appropriate action to perform. When the weather is colder, the access control system 102 can determine an action such as speaking a key phrase or making a certain gesture. When the weather is warmer, the access control system can determine an action such as making a certain facial expression that might be more difficult to detect when the weather is colder, e.g., and the person might be wearing a jacket that makes facial expressions more difficult to detect.

The access control system 102 can use data about protective equipment the person is wearing when determining the instructions to provide to the person. For instance, the access control system 102 can determine if the person is wearing a mask, gloves, or other personal protective equipment. If the access control system 102 determines that the person is not wearing some personal protective equipment, the access control system 102 can determine instructions that indicate that the person should put on one or more articles of personal protective equipment before the access control system 102 will provide the person access to the premises 104, before the access control system 102 will notify another person that the person is at the premises 104, or both.

The access control system 102 can use any appropriate process to determine whether the person is wearing personal protective equipment. For instance, the access control system 102 can use video analytics to detect a face in an image of the person. When the face includes a nose, a mouth, or both, the access control system 102 can determine that the person is not wearing a mask. The access control system 102 can use a classifier trained to detect whether a person is likely wearing a mask.

In some examples, the access control system 102 can determine whether the person is wearing compliant personal protective equipment. For example, the access control system 102 can determine whether the person is wearing any personal protective equipment and, if so, whether the worn personal protective equipment satisfies one or more requirements. In some examples, the access control system 102 can perform a single determination to ensure that the person is wearing compliant personal protective equipment. For instance, the access control system 102 can use a classifier trained to detect compliant personal protective equipment in this determination.

In some implementations, the access control system 102 can determine a risk factor for the person. The risk factor can indicate a likelihood that the person is sick, does not have certain certifications, or both. The certain certifications can be immunity test results, e.g., for a disease; proof of vaccination; a negative illness test result, e.g., determined within a threshold period of time; or a combination of two or more of these.

In some examples, the access control system 102 can determine the risk factor using data from a questionnaire. For instance, the access control system 102 can receive data for a questionnaire filled out by the person. The access control system 102, or another system, can provide the questionnaire to a device operated by the person prior to the day the person goes to the premises 104, when the person arrives at the premises 104, or at another appropriate time. In some examples, the access control system 102, or the other system, can use the data from the questionnaire depending on consent settings for the data. For example, the access control system 102 or the other system can receive data for a questionnaire from a device operated for the person each morning. The access control system 102 can use the data when determining whether to grant the person access to each of multiple different premises the person visits, depending on whether the consent settings indicate that the access control system 102 can use the data for the respective premises.

The access control system 102 can determine the risk factor using video data, such as visible light video data, infrared video data, or both. The access control system 102 can use video data, e.g., visible light video data, to determine whether actions performed by the person likely indicate that the person is sick. For instance, the access control system 102 can determine whether the person coughed or sneezed, might have difficulty breathing, or performs another action that indicates that the person is likely sick.

When the access control system 102 determines that the person is likely sick, the access control system 102 can determine that the person has a risk factor that satisfies a threshold risk factor. The threshold risk factor can indicate a level that, when satisfied, indicates that the access control system 102 likely should not provide the person access to the premises 104, should not notify another person that the person is at the premises 104, should notify another person that the person is at the premises 104 and has a high risk factor, or a combination of these.

The access control system 102 can use video data, e.g., infrared video data, thermometer data, or both, to determine a temperature for the person. When the access control system 102 determines that the person likely has an elevated temperature, the access control system 102 can determine that the person has a high risk factor, e.g., that satisfies the threshold risk factor, is likely sick, or both. The temperature for the person can be an estimated skin-temperature for the person or another appropriate temperature.

In some implementations, the access control system 102 can use data from other sensors 106 to determine a predicted pulse, predicted blood oxygen level, or both, for the person. These other sensors can be sensors at a system remote from the access control system, e.g., a medical facility, or another appropriate location. The access control system can use the predicted pulse, the predicted blood oxygen level, or both, to determine a risk factor for the person. When the predicted pulse, the predicted blood oxygen level, or both, are outside threshold ranges, the access control system 102 can determine that the person has a higher risk factor than if the values were within corresponding threshold ranges.

A risk factor can be represented by a numerical value, textual characters, or other appropriate data. A higher risk factor can be represented by a higher numerical value. In some examples, a higher risk factor can be represented by a lower numerical value.

In some examples, the access control system 102 can use audio data to determine whether the person is likely sick. For instance, the access control system 102 can analyze the audio data to detect sounds that are likely indicative of difficulty breathing.

The access control system 102 can use contextual information during its analysis. For instance, if the access control system 102 determines that the person was likely exercising, e.g., based on the clothes the person is wearing, and might be having difficulty breathing, the access control system 102 can determine that the person has a low risk factor, e.g., because the person was likely jogging before arriving at the premises.

In some implementations, the access control system 102 can use contextual information to determine that the person should be granted access to the premises 104. For instance, when the access control system 102 determines that the person is likely a rescuer, such as a fireman or an emergency medical technician, the access control system 102 can determine that the person should be granted access to the premises 104. This can occur even though the person might not satisfy other criteria for gaining access to the premises 104, such as performing a predetermined gesture.

The access control system 102 can make this determination using additional contextual information. The additional contextual information can include information about a recent emergency call from the premises 104, data received from a fire alarm at the premises 104, or other appropriate contextual information.

The access control system 102 can use the risk factor when determining an action to perform. For instance, when the person has a risk factor that satisfies a threshold risk factor, the access control system 102 can present a notification to another person at the premises 104 that indicates that the person has a high risk factor. The access control system 102 can use the notification devices 114, e.g., the speaker 114*b*, the display 114*c*, or both, to indicate the risk factor. For example, the access control system 102 can present a message that the person is "potentially high risk, so answering the door is not recommended."

In some examples, the access control system 102 can use data about the risk factor, such as whether the person is wearing personal protective equipment, when generating the notification. For instance, when the access control system 102 determines that the person is not likely wearing a mask, the access control system 102 can provide a notification to another person at the premises 104 that indicates that the person is not likely wearing a mask. In these examples, instead of or in addition to providing the notification to the other person about the person's lack of a mask, the access control system 102 can automatically provide instructions to the person indicating that the person should put on a mask before they will be allowed access to the premises 104. If the access control system 102 detects authorization for the person to access the premises 104, e.g., granted by the other person, the access control system 102 can prevent the authorization unless and until the person puts on a mask.

In some implementations, the access control system 102 can use the risk factor for a person, one or more parameters used to determine the risk factor, or both, when determining an instruction to give to the person. For example, when the access control system 102 determines that the person has a high risk factor, is potentially sick, or both, the access control system 102 can present an instruction that requests that the person perform one or more actions that the person would not be requested to perform if the person had a lower risk factor, was not potentially sick, or both.

The access control system 102 can generate an instruction that requests that the person remove one or more items of personal protective equipment so that the access control system 102 can perform additional analysis of images of areas that were previously covered by personal protective equipment. This can include generating an instruction that requests removal of a face mask. When the access control system 102 detects that the face mask has been substantially removed, e.g., either completely or sufficiently for additional image analysis, the access control system 102 can capture one or more images of the person. The access control system 102 can analyze the images to determine an updated risk factor, whether the person is likely sick, or both. The access control system 102 can then use the updated risk factor, the determination whether the person is likely sick, or both, when making a decision of whether to allow the person access to the premises 104 or in another process described in this document.

The access control system 102 can generate an instruction that requests that the person move to a particular location. The particular location can be a physical location that is at least a threshold distance from another person, a door to the premises 104, or both. The particular location can be a location at which the person should leave a package, from which the person can communicate with another person at the premises, e.g., a home owner, or both.

The access control system 102 can generate an instruction that requests that the person get verified that they are not sick, are not contagious, or both. For instance, the access control system 102 can generate and provide an instruction that requests the person go to a medical facility, a particular location at the premises 104, or both, before the access control system 102 provides the person access to the premises 104. The access control system 102 can receive, from another system for the medical facility, medical information for the person, e.g., upon the person's consent to such receipt. The access control system 102 can then use the medical information to determine a risk factor, whether to allow the person access to the premises 104, or both. In some examples, the access control system 102 can receive the medical information prior to the person's arrival at the premises 104.

When the access control system 102 provides an instruction requesting that the person go to a particular location at the premises 104, the access control system 102 can receive data from a component at the particular location that indicates whether the person is likely sick. For instance, the access control system 102 can include an infrared camera at the particular location. The access control system 102 can analyze an image of the person captured by the camera to determine a likely body temperature for the person and use the likely body temperature to determine whether the person is likely sick. In some examples, the access control system 102 can provide an instruction requesting that the person present a particular part of their body, e.g., an exposed arm, of which the camera can capture an image. In some examples, the access control system 102 can request that the person take a particular test at the particular location, e.g., an instant swab test.

In some implementations, the access control system 102 can use a risk factor when determining whether to override a potential notification to another person at the premises 104. For instance, when the access control system 102 determines that the person has a risk factor that satisfies a threshold risk factor and detects activation of a doorbell by the person, the access control system 102 can prevent the doorbell from triggering. This can include the access control system 102 preventing the speaker 114b from indicating that the person is at the premises. When the access control system 102 determines that the person has a risk factor that does not satisfy the threshold risk factor and detects activation of the doorbell by the person, the access control system 102 can determine to allow the doorbell to trigger, or determine to send a message to trigger the doorbell, e.g., both of which are generally referred to as triggering the doorbell.

The access control system 102 can determine a period of time to wait before notifying another person at the premises 104 using the risk factor. For example, when the access control system 102 determines that the person has a high risk factor, e.g., that satisfies the threshold risk factor, the access control system 102 can wait a longer period of time before telling the other person at the premises 104 that the person was at the premises 104 than if the person has a lower risk factor, e.g., that does not satisfy the threshold risk factor. This can occur when the person delivered a package at the premises 104 and then left, e.g., and is not waiting to speak to the person or otherwise gain access to the premises 104.

The access control system 102 can determine a period of time after which it is likely safe for the other person to enter one or more areas entered by the person using the risk factor. For instance, the access control system 102 can track areas the person accessed, such as a stoop by a front door of the premises 104; areas the person touched, such as a doorbell or a door handle; or both. When the access control system 102 determines that the person has a high risk factor, e.g., that satisfies the threshold risk factor, the access control system 102 can determine a longer period of time than if the person had a lower risk factor, e.g., that does not satisfy the threshold risk factor. The access control system 102 can provide the other person at the premises 104 with a notification about the period of time after which it is likely safe for the other person to enter the one or more areas near entered by the person. The access control system 102 can determine a duration of this period of time based on a likelihood that a sufficient level of decontamination has taken place, based on a likelihood that any pathogens in the areas have died, or both.

In some implementations, the access control system 102 can determine access credentials for the person. For instance, the access control system 102 can determine whether the person has credentials that indicate that the person is allowed to access the premises 104. In these implementations, the premises 104 can be a building, a part of the building, or another appropriate area. The outdoor speaker 114a can be a speaker that is outside the premises 104, or inside the premises 104, that can provide audible instructions to the person while being located within another structure.

The access control system 102 can use badge authentication, biometric identification, or both, to determine the credentials for the person. The access control system 102 can use any appropriate process, devices, or both, to determine the credentials for the person, whether the person is allowed to access the premises 104 based on the credentials, or both.

When the access control system 102 determines that the person is allowed access to the premises 104, the access control system 102 can automatically open a door to provide the person access to the premises 104. For instance, the access control system 102 can send a message to a motor that actives the motor and causes the motor to open the door. The access control system 102 can determine that the person is allowed access to the premises using instructions received from another person at the premises, credentials for the person, or both.

In some implementations, the access control system 102 can determine whether to allow the person access to a portion of the premises 104. For instance, the access control system 102 can use the risk factor or other data, e.g., described in this document, to determine an amount of access to the premises 104 for the person. When the person has a high risk factor, the access control system 102 can provide the person access to a minimal portion of the premises 104, such as a controlled package drop off area, a garage, or both. The controlled package drop off area can be a room, e.g., a foyer, a lobby, or a waiting room; or an area in or around the premises, e.g., a back deck. The access control system 102 can then minimize an amount of exposure the person has to the premises 104; take one or more measures to clean the controlled package drop off area, the garage, or both; perform another appropriate action; or a combination of these. Another appropriate action can include providing a notification to a device of another person at the premises that indicates that the person accessed the controlled package drop off area, the garage, or both, e.g., and that the other person should not access those areas for a threshold period of time.

Some components or all components of the access control system 102 can be physically located at the premises 104. For instance, the sensors 106, including the cameras 108, and the notification devices 114 can be physically located at the premises 104.

Some components or all components of the access control system 102 can be at a physical location separate from the premises 104. For instance, the access prediction engine 110, part or all of the notification devices 114, or both, can be implemented on the cloud. In some examples, the notification devices 114 can include a notification generation engine, e.g., located on the cloud, that sends instructions to a device located on the premises 104 that presents a notification, e.g., the speakers 114a-b, the display 114c, or both.

The access control system 102 is an example of a system implemented as computer programs on one or more computers in one or more locations, in which the systems, components, and techniques described in this document are implemented. The notification devices 114a-c may include personal computers, mobile communication devices, speakers, displays, and other devices that can send and receive data over a network. The network (not shown), such as a local area network (LAN), wide area network (WAN), the Internet, or a combination thereof, connects the notification devices 114, the sensors 106, and the other components of the access control system 102, e.g., the access prediction engine 110 and a database that stores the threshold criteria 112. The access control system 102 may use a single server computer or multiple server computers operating in conjunction with one another, including, for example, a set of remote computers deployed as a cloud computing service.

The access control system 102 can include several different functional components, including the access prediction engine 110, and a notification engine. The access prediction engine 110, or the notification engine, or a combination of these, can include one or more data processing apparatuses. For instance, each of the access prediction engine 110, and the notification engine can include one or more data processors and instructions that cause the one or more data processors to perform the operations discussed herein.

The various functional components of the access control system 102 may be installed on one or more computers as separate functional components or as different modules of a same functional component. For example, the access prediction engine 110, the notification engine, or both, can be implemented as computer programs installed on one or more computers in one or more locations that are coupled to each through a network. In cloud-based systems for example, these components can be implemented by individual computing nodes of a distributed computing system.

Figure 2:
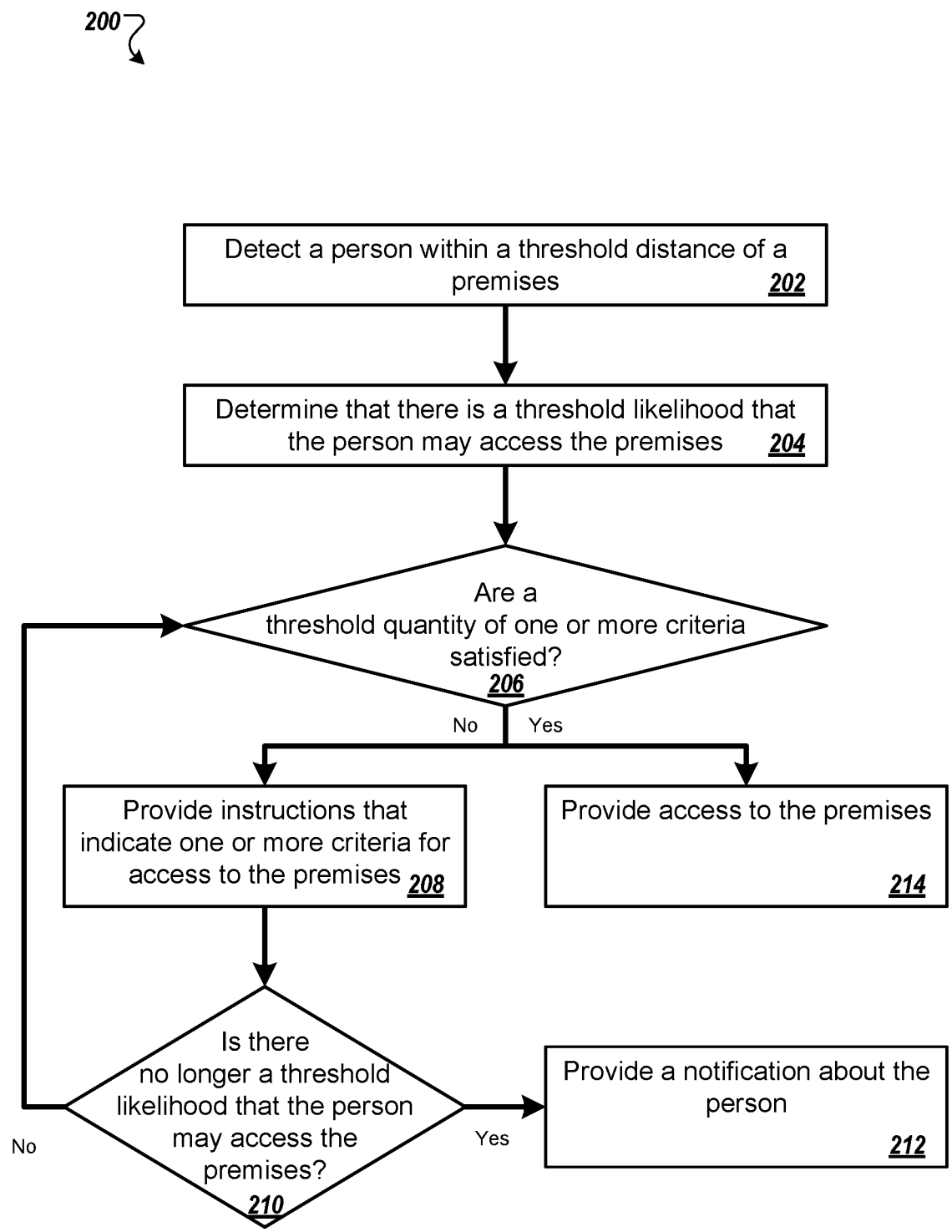
FIG. 2 is a flow diagram of a process for determining whether to provide access to a premises.

FIG. 2 is a flow diagram of a process 200 for determining whether to provide access to a premises. For example, the process 200 can be used by the access control system 102 from the environment 100.

An access control system detects a person within a threshold distance of a premises (202). For instance, the access control system can receive data from a sensor, such as a camera or a motion sensor. The camera can be a doorbell camera. The access control system can analyze the received data to determine whether the data indicates that a person is within a threshold distance of the premises.

In some implementations, the access control system can analyze the data to determine whether the data indicates movement of a person or another object. Another object can include an animal or a toy, e.g., a ball, to name a few examples. The access control system can determine whether the data indicates movement of a person or another object by activating an additional sensor; turning on a light, e.g., in a low light physical environment; providing an instruction, e.g., audible or visual, and determining whether a person acts according to the instruction; or performing other processing on the data. To activate an additional sensor, the access control system can activate a camera when the data was received from a motion sensor. To perform other processing, the access control system might initiate a routine that is normally disabled to reduce power usage, which routine provides a higher accuracy when determining whether data indicates movement of a person or another object.

The access control system can use the determination of what type of object is detected to determine whether to preform additional processing. For instance, when the access control system determines that a detected object is likely a person, the access control system can continue with the process 200. When the access control system determines that a detected object is not likely a person, the access control system can stop performing the process 200.

The access control system determines that there is a threshold likelihood that the person may access the premises (204). As described in more detail above, the access control system can determine whether the person is likely delivering a package, likely retrieving an object that fell onto an area near the premises, e.g., a house's yard, or will likely knock on a door for the premises. If the access control system determines that the person will likely knock on the door for the premises, the access control system can determine that there is a threshold likelihood that the person may access the premises. If the access control system determines that the person is likely delivering a package or likely retrieving an object that fell onto an area near the premises, the access control system can determine that there is not a threshold likelihood that the person may access the premises.

The access control system determines whether a threshold quantity of one or more criteria are satisfied (206). The criteria can include any appropriate criteria, such as those described in more detail above. Some example criteria can include whether the person is within a threshold distance of the door to the premises, is wearing one or more articles of personal protective equipment, has made one or more predetermined gestures, has spoken one or more predetermined key phrases, or a combination of two or more of these.

In response to determining that the threshold quantity of one or more criteria are not satisfied, the access control system provides instructions that indicate one or more criteria for access to the premises (208). For instance, the access control system can provide audible, visible, or both, instructions that indicate how the person can access the premises. These instructions can include instructions on how to access the premises without physically touching the door, a doorbell for the premises, or both. The instructions can indicate a location at which the person should stand; a gesture, such as waiving, that the person should make; or both.

The threshold quantity can be any appropriate quantity. The access control system can determine a value for the threshold quantity using contextual information, e.g., such as weather information. For instance, the access control system can have a first quantity of criteria when it is raining and a second, different quantity of criteria when it is not raining.

The access control system determines whether there is no longer a threshold likelihood that the person may access the premises (210). For instance, the access control system can determine whether the original determination that there was a threshold likelihood that the person might access the premises has changed. This can occur when it initially appears that the person will knock on the door, but the person leaves a letter at the front door instead.

The access control system can determine that there is no longer a threshold likelihood that the person may access the premises when a predetermined period of time has passed since detecting the person, during which period of time the threshold quantity of one or more criteria have not been satisfied. This can occur when the person enters a yard and stands on the edge of the yard for a threshold period of time without the access control system determining that a sufficient quantity of the criteria are satisfied, e.g., by the person or otherwise.

In response to determining that there is no longer a threshold likelihood that the person may access the premises, the access control system provides a notification about the person (212). For example, the access control system can provide a notification to another person in the premises that indicates that the person is at the premises, as described in more detail above. The notification can indicate that the person is not likely to access the premises.

The provision of the instructions that indicate the one or more criteria for access to the premises can be performed after determining that the threshold quantity of criteria are not satisfied (206). In some examples, in response to determining that there is still a threshold likelihood that the person may access the premises (210), the access control system provides the instructions that indicate the one or more criteria for access to the premises (208). After providing the instructions (208) or determining that the threshold likelihood is still satisfied (210), the access control system can determine whether the one or more criteria have been satisfied (206).

Upon determining that the threshold criteria still have not been satisfied, the access control system can stop performing the process 200, can provide instructions that indicate one or more different criteria for accessing the premises, determine whether there is no longer a threshold criteria that the person may access the premises, or a combination of these. For example, the access control system can perform step 210 a first time and then, if the response to step 210 is still no a second time, stop performing the process 200.

In response to determining that the threshold quantity of one or more criteria are satisfied, the access control system provides access to the premises (214). To provide access to the premises, the access control system can provide a notification to another person at the premises about the person, open a door at the premises, or both. The former can include the access control system providing a notification to a resident at the premises that indicates that the person is at the premises. In some examples, the access control system can provide the notification by ringing a virtual doorbell, e.g., that includes a speaker at the premises but does not necessarily include an actually doorbell button outside.

The order of steps in the process 200 described above is illustrative only, and determining whether to provide access to the premises can be performed in different orders. For example, the access control system can provide the instructions (e.g., step 208) prior to determining that there is a threshold likelihood that the person may access the premises (e.g., step 204). In some examples, the access control system can provide the instructions (e.g., step 208) prior to determining whether the threshold quantity of one or more criteria are satisfied (e.g., step 206).

In some implementations, the process 200 can include additional steps, fewer steps, or some of the steps can be divided into multiple steps. For example, the access control system can perform steps 202, 204, 206, 208, and 214 without performing the other steps in the process.

Figure 3:
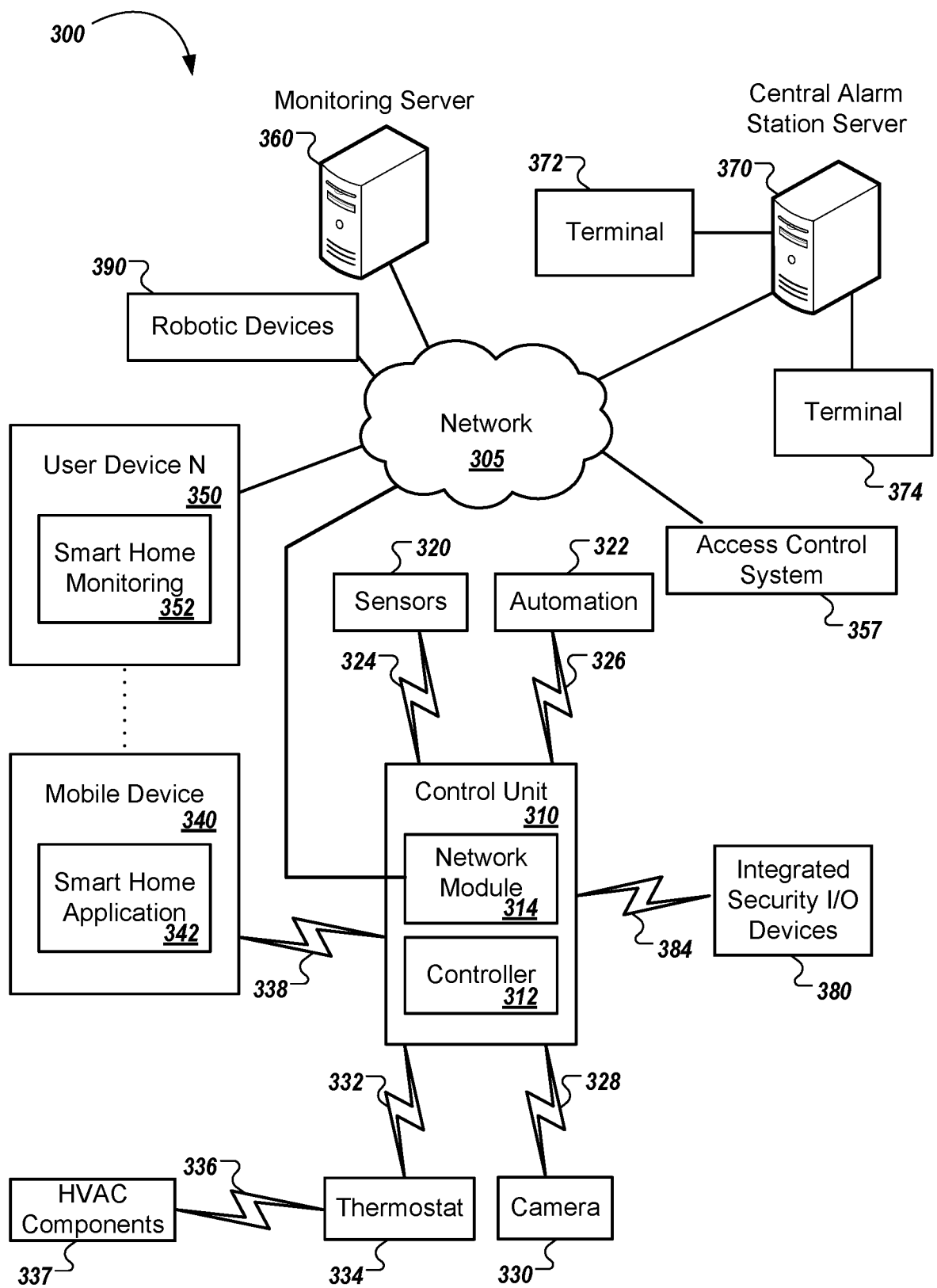
FIG. 3 is a diagram illustrating an example of a home monitoring system.

FIG. 3 is a diagram illustrating an example of a home monitoring system 300. The home monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system 300 may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. Also, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area or video images of the area in which multiple images of the area are captured at a relatively high frequency (e.g., thirty images per second) or both. The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries, e.g., if located remotely from the control unit 310. The camera 330 may employ a small solar cell to recharge the battery when light is available. The camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

The system 300 includes access control system 357. The access control system 357 can be computing devices (e.g., a computer, microcontroller, FPGA, ASIC, or other device capable of electronic computation) capable of receiving data related to the access control system and communicating electronically with the monitoring system control unit 310.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 390 may be robotic devices 390 that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zig-Bee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the home monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the home monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

Also, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events (e.g., alarm events) generated by the control unit 310. In this example, the monitoring server 360 may exchange electronic communications with the network module 314 included in the control unit 310 to receive information regarding events (e.g., alerts) detected by the control unit 310. The monitoring server 360 also may receive information regarding events (e.g., alerts) from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system 300 and perform analysis of sensor and image data received from the monitoring system 300. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The central alarm station server 370 is an electronic device configured to provide alarm monitoring service by exchanging communications with the control unit 310, the one or more mobile devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring server 360 and/or the control unit 310 over the network 305. The user device 350 may be configured to display a smart home user interface 352 that is generated by the user device 350 or generated by the monitoring server 360. For example, the user device 350 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, ZigBee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, the robotic devices 390, and the access control system 357. The one or more user devices 340 and 350 receive data directly from the sensors 320, the home automation controls 322, the camera 330, the robotic devices 390, and the access control system 357 and sends data directly to the sensors 320, the home automation controls 322, the camera 330, the robotic devices 390, and the access control system 357. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, the robotic devices 390, and the access control system 357 are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, the robotic devices 390, and the access control system 357 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, the robotic devices 390, and the access control system 357 to a pathway over network 305 when the one or more user devices 340 and 350 are farther from the sensors 320, the home automation controls 322, the camera 330, the thermostat 334, the robotic devices 390, and the access control system 357. In some examples, the system leverages GPS information from the one or more user devices 340 and 350 to determine whether the one or more user devices 340 and 350 are close enough to the sensors 320, the home automation controls 322, the camera 330, the thermostat 334, the robotic devices 390, and the access control system 357 to use the direct local pathway or whether the one or more user devices 340 and 350 are far enough from the sensors 320, the home automation controls 322, the camera 330, the thermostat 334, the robotic devices 390, and the access control system 357 that the pathway over network 305 is required. In other examples, the system leverages status communications (e.g., pinging) between the one or more user devices 340 and 350 and the sensors 320, the home automation controls 322, the camera 330, the thermostat 334, the robotic devices 390, and the access control system 357 to determine whether communication using the direct local pathway is possible. If communication using the direct local pathway is possible, the one or more user devices 340 and 350 communicate with the sensors 320, the home automation controls 322, the camera 330, the thermostat 334, the robotic devices 390, and the access control system 357 using the direct local pathway. If communication using the direct local pathway is not possible, the one or more user devices 340 and 350 communicate with the sensors 320, the home automation controls 322, the camera 330, the thermostat 334, the robotic devices 390, and the access control system 357 using the pathway over network 305.

In some implementations, the system 300 provides end users with access to images captured by the camera 330 to aid in decision-making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system 300 and other events sensed by the monitoring system 300 may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
detecting, by an access control system implemented on one or more computers and using an image that depicts a person, the person is likely within a threshold distance of a door of a premises;
determining, by the access control system, whether a first threshold likelihood that the person may access the door is satisfied or the person is likely only performing another action that does not require access to the door;
in response to determining that the first threshold likelihood that the person may access the door is satisfied and that the person is not likely only performing another action that does not require access to the door, providing, by the access control system and to a presentation device, instructions that cause the presentation device to indicate one or more criteria for access to the door;
after providing the instructions, determining, by the access control system, that a threshold quantity of the one or more criteria, for access to the door and that were indicated by the presentation device in response to the provided instructions, are satisfied;
determining, by the access control system, a risk factor indicating a likelihood of at least one of the person being sick or having one or more certifications; and
in response to determining that the threshold quantity of the one or more criteria are satisfied:
determining, by the access control system and from a plurality of action types for when the threshold quantity of the one or more criteria are satisfied and according to the risk factor, an action type that indicates an amount of access to the premises that includes at least access to the door; and
providing, by the access control system, the person access to the premises according to the amount of access that includes at least access to the door and was determined from the plurality of action types for when the threshold quantity of the one or more criteria are satisfied and according to the risk factor, the providing comprising sending, by the access control system via a network to a motor that activates the door, a message that causes the motor to maintain the door in an open position.

2. The method of claim 1, wherein the image does not depict the door.

3. The method of claim 1, wherein detecting the person within the threshold distance of the door comprises:
detecting, using audio data that encodes the person speaking, that the person is likely within the threshold distance of the door.

4. The method of claim 1, wherein detecting the person within the threshold distance of the door comprises:
detecting, using motion data that indicates movement of the person, that the person is likely within the threshold distance of the door.

5. The method of claim 1, wherein:
providing the instructions that indicate the one or more criteria for access to the door comprises providing the instructions that indicate one or more predetermined actions for the person to perform to gain access to an area behind the door without touching the door;
determining that the threshold quantity of the one or more criteria are satisfied comprises determining that the threshold quantity of the one or more predetermined actions are satisfied; and
providing access to the door is responsive to determining that the threshold quantity of the one or more predetermined actions are satisfied.

6. The method of claim 1, wherein providing the instructions that indicate the one or more criteria for access to the door comprises:
providing the instructions that indicate one or more actions for the person to perform to trigger a virtual doorbell.

7. The method of claim 6, wherein:
determining that the threshold quantity of the one or more criteria are satisfied comprises determining that the person satisfied at least a threshold likelihood of performing the one or more actions; and
providing access to the door comprises triggering the virtual doorbell for the premises, the method comprising:
receiving, from a device for the premises, instructions that indicate that the person should be allowed access to the door.

8. The method of claim 7, comprising:
in response to receiving the instructions that indicate that the person should be allowed access to the door, performing, by a control device at the premises, at least one of unlocking the door or opening the door.

9. The method of claim 7, wherein triggering the virtual doorbell comprises sending a message to a mobile device to cause the mobile device to trigger a virtual doorbell.

10. The method of claim 7, wherein triggering the virtual doorbell comprises sending a message to a device with a speaker to cause the speaker to trigger a virtual doorbell.

11. The method of claim 1, wherein providing the instructions that indicate the one or more criteria for access to the door comprises:
providing, to a device with a speaker, the instructions that indicate the one or more criteria for access to the door to cause the speaker to present the one or more criteria audibly.

12. The method of claim 1, wherein providing the instructions that indicate the one or more criteria for access to the door comprises:
providing, to a display device, the instructions that indicate the one or more criteria for access to the door to cause the display device to present the one or more criteria visually.

13. The method of claim 1, wherein providing the instructions that indicate the one or more criteria for access to the door comprises providing, to a device operated by the person and after detecting the person within the threshold distance of the door, the instructions that indicate the one or more criteria for access to the door to cause the device operated by the person to present the one or more criteria.

14. The method of claim 1, wherein providing the instructions that indicate the one or more criteria for access to the door comprises providing, to a device for a premises and after detecting the person within the threshold distance of the door, the instructions that indicate the one or more criteria for access to the door to cause the device for the premises to present the one or more criteria.

15. The method of claim 14, wherein the device for the premises is physically connected to the premises.

16. The method of claim 1, comprising:
determining a value for the threshold quantity using contextual data for when the person was detected within the threshold distance of the door.

17. The method of claim 1, comprising:
selecting, from a plurality of criteria, the one or more criteria using contextual data for when the person was detected within the threshold distance of the door.

18. The method of claim 1, wherein providing access to the door comprises performing at least one of unlocking the door or opening the door.

19. A system comprising:
one or more first sensors;
a motor;
a network;
one or more computers and one or more storage devices on which are stored instructions that are operable, when executed by the one or more computers, to cause the one or more computers to perform operations comprising:
detecting, by an access control system implemented on the one or more computers and using sensor data captured by the one or more first sensors, a person within a threshold distance of a premises;
determining whether a threshold likelihood that the person may deliver a package at the premises is satisfied; and
in response to determining that the threshold likelihood that the person may deliver a package at the premises is satisfied:
determining, using first environmental condition data captured by one or more second sensors and data for at least one of the person or the package, a first predicted time period after delivery of the package and that, when satisfied, indicates a time by which decontamination of the package is predicted to be substantially complete given first environmental conditions represented by the first environmental condition data;
determining, using contextual data for the package and second environmental condition data captured by one or more third sensors and representing second environment conditions associated with the package, a second predicted time period for predicted package contents to be able to withstand the second environment conditions;
determining, using the first predicted time period and the second predicted time period, a wait time that indicates a recommended time period to wait before retrieval of the package;
generating instructions to cause presentation of a user interface that indicates a delivery location for the package;
providing, to a presentation device for the premises and using the wait time, the instructions to cause the presentation device to present the user interface that indicates the delivery location for the package; and
sending, using the wait time and via the network to the motor that activates a door, a message that causes the motor to maintain a position of the door.

20. The system of claim 19, wherein generating the instructions to cause presentation of the user interface comprises generating instructions to cause presentation of the user interface that indicates a) the delivery location for the package, b) the wait time, and c) a message recommending that the package be retrieved after expiration of the wait time.

21. The system of claim 19, wherein providing, to the presentation device and using the wait time, the instructions comprises:
waiting until the wait time expires; and
after expiration of the wait time, providing, to the presentation device, the instructions to cause the presentation device to present the user interface that indicates the delivery location for the package.

22. One or more non-transitory computer storage media encoded with instructions that, when executed by one or more computers, cause the one or more computers to perform operations comprising:

detecting, by an access control system implemented on the one or more computers and using sensor data captured by one or more sensors, a person within a threshold distance of a door of a premises;

determining whether a first threshold likelihood that the person may access the door is satisfied or the person is likely only performing another action that does not require access to the door;

in response to determining that the first threshold likelihood that the person may access the door is satisfied and that the person is not likely only performing another action that does not require access to the door, providing, to a presentation device, instructions that cause the presentation device to indicate one or more criteria for access to the door;

after providing the instructions, determining that a threshold quantity of the one or more criteria, for access to the door and that were indicated by the presentation device in response to the provided instructions, are satisfied;

determining a risk factor indicating a likelihood of at least one of the person being sick or having one or more certifications; and in response to determining that the threshold quantity of the one or more criteria are satisfied:

determining, from a plurality of action types for when the threshold quantity of the one or more criteria are satisfied and according to the risk factor, an action type that indicates an amount of access to the premises that includes at least access to the door; and providing the person access to the premises according to the amount of access that includes at least access to the door and was determined from the plurality of action types for when the threshold quantity of the one or more criteria are satisfied and according to the risk factor, the providing comprising sending, by the access control system via a network to a motor that activates the door, a message that causes the motor to maintain the door in an open position.

\* \* \* \* \*